(12) United States Patent
Kwon et al.

(10) Patent No.: US 7,903,572 B2
(45) Date of Patent: Mar. 8, 2011

(54) METHOD AND APPARATUS FOR DETERMINING A DATA RATE

(75) Inventors: Young-Hoon Kwon, Sungnam-si (KR); Jang-Hoon Yang, Sungnam-si (KR); In-Seok Hwang, Seoul (KR)

(73) Assignee: Samsung Electronics Co., Ltd (KR)

( * ) Notice: Subject to any disclaimer, the term of this patent is extended or adjusted under 35 U.S.C. 154(b) by 1069 days.

(21) Appl. No.: 11/280,771

(22) Filed: Nov. 16, 2005

(65) Prior Publication Data

US 2006/0105717 A1    May 18, 2006

(30) Foreign Application Priority Data

Nov. 16, 2004   (KR) .................... 10-2004-0093360

(51) Int. Cl.
*H04L 1/00* (2006.01)
(52) U.S. Cl. ............... 370/252; 370/320; 370/328; 455/447; 455/452.2; 455/522
(58) Field of Classification Search .............. None
See application file for complete search history.

(56) References Cited

U.S. PATENT DOCUMENTS 5,671,221 A * 9/1997 Yang .................. 370/320
2002/0155854 A1 * 10/2002 Vanghi .................. 455/522
2005/0099973 A1 * 5/2005 Qiu et al. .................. 370/328
2007/0002786 A1 * 1/2007 Herrmann .................. 370/328

FOREIGN PATENT DOCUMENTS

| KR | 1020010019655 | 3/2001 |
| KR | 1020020001299 | 1/2002 |
| KR | 1020050082659 | 8/2005 |
| WO | WO 97/02665 | 1/1997 |
| WO | WO 99/43101 | 8/1999 |

* cited by examiner

*Primary Examiner*—Zhiyu Lu
(74) *Attorney, Agent, or Firm*—The Farrell Law Firm, LLP (57) ABSTRACT

A data rate determining method and apparatus in a smart-antenna mobile communication system are provided. A ratio of other-cell interference to AWGN in total noise received at an MS is estimated and a power margin is applied in proportion to highly time-variant other-cell interference. Therefore, despite a change in the other cell interference between a rate decision time and an actual data transmission time, a successful data transmission rate is increased.

11 Claims, 8 Drawing Sheets

| SNR [dB] | MODULATION ORDER | CODING RATE | DATA RATE [Mbps] |
|---|---|---|---|
| < −3.0 | QPSK | 1/12 | 614 |
| < −0.5 | QPSK | 1/6 | 1,229 |
| < 2.5 | QPSK | 1/3 | 2,458 |
| < 5.0 | QPSK | 1/2 | 3,686 |
| < 7.5 | QPSK | 2/3 | 4,915 |
| < 10.0 | 16QAM | 1/2 | 7,373 |
| < 12.5 | 16QAM | 2/3 | 9,830 |
| < 14.5 | 16QAM | 3/4 | 11,059 |
| < 16.5 | 64QAM | 2/3 | 14,746 |
| > 16.5 | 64QAM | 5/6 | 18,432 |

METHOD AND APPARATUS FOR DETERMINING A DATA RATE

PRIORITY

This application claims priority under 35 U.S.C. §119 to an application entitled "Method And Apparatus For Determining Data Rate" filed in the Korean Intellectual Property Office on Nov. 16, 2004 and assigned Serial No. 2004-93360, the contents of which are incorporated herein by reference.

BACKGROUND OF THE INVENTION

1. Field of the Invention

The present invention relates generally to a method and apparatus for determining a data rate in a cellular mobile communication system using a smart antenna, and in particular, to a method and apparatus for efficiently and stably allocating an appropriate data rate to a mobile station (MS) despite time-variant other-cell interference from neighbor base stations (BSs) arising from the use of smart antennas in the BSs.

2. Description of the Related Art

In a cellular mobile communication system, a BS communicates with a plurality of MSs simultaneously. The Signal-to-Noise Ratio (SNR) strength of a signal received at an MS from the BS varies depending on the location of the MS and an environment in which the MS is placed within a cell area. As the MS is farther from the BS and as more shadowing areas exist in the path between the BS and the MS, the SNR of the received signal becomes lower. With the same transmit power, the BS allocates a relatively high data rate to an MS with a high SNR and a relatively low data rate to an MS with a low SNR, thereby ensuring reception quality at or above an acceptable level.

The cellular mobile communication system can concentrate a transmitted signal in a specific direction based on the location of the MS within the cell by means of a smart antenna. The SNR of a signal received at the MS from the BS is increased by concentrating the transmitted signal into the location of the MS within the cell using the smart antenna. Accordingly, the smart antenna enables a higher data rate for the MS in the same radio channel environment. As to another MS, the smart antenna can also concentrate transmit power into the location of the MS.

Due to the concentration of transmit power from the BS in a specific direction by the smart antenna, the transmit power varies in time and space. Therefore, when neighbor BSs also use smart antennas, interference from the neighbor BSs varies over time.

Figure 1:
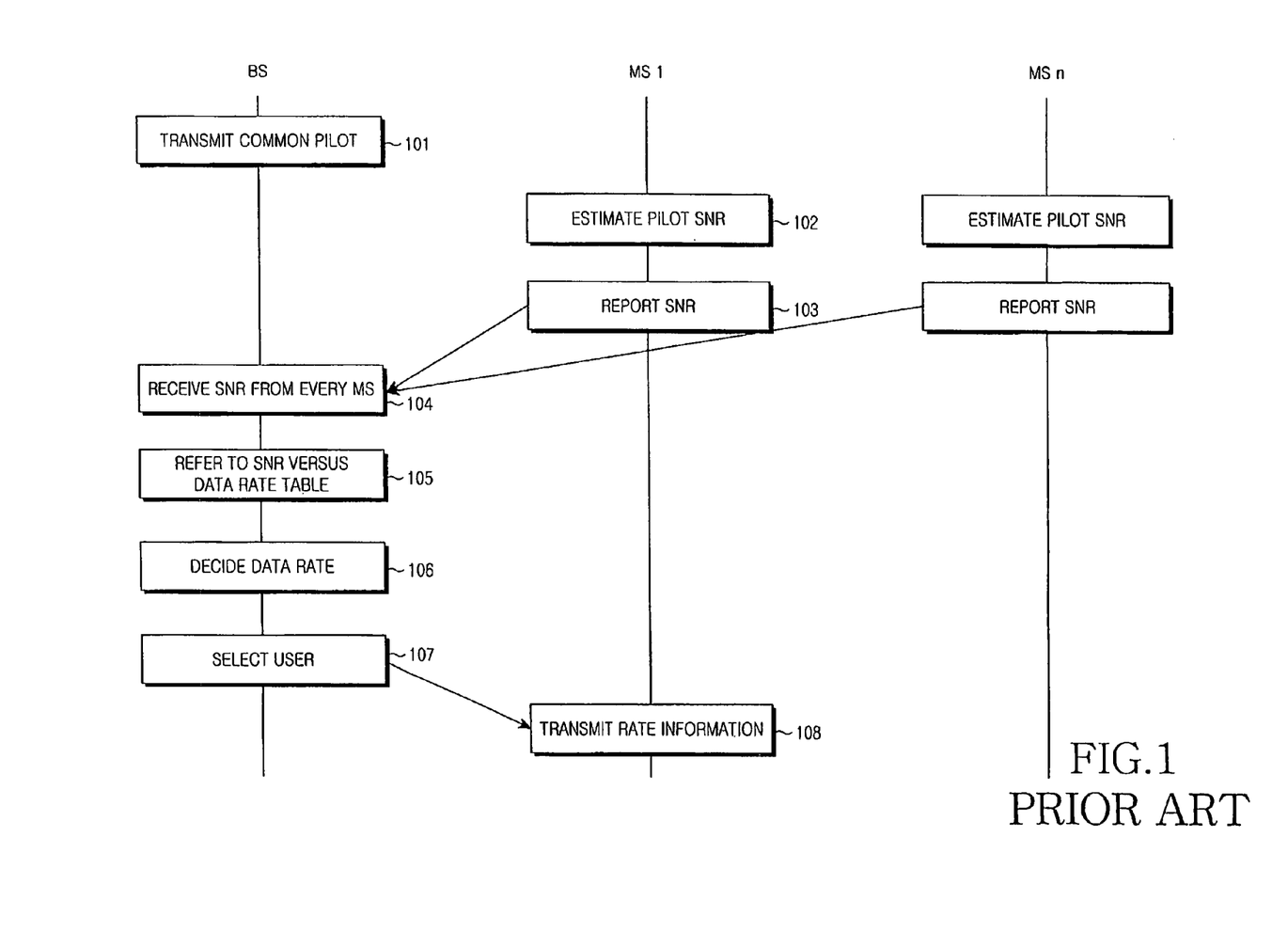
FIG. 1 is a flowchart illustrating a conventional data rate determining method.

FIG. 1 is a flowchart illustrating a conventional data rate determining method. Conventionally, a BS determines a data rate for an MS.

Referring to FIG. 1, the BS transmits a common pilot signal all over the coverage area of a cell managed by the BS in step 101. All MSs within the coverage area of the cell measure the SNRs of the received common pilot signal periodically in step 102 and feed back the SNR measurements to the BS periodically in step 103. For the feedback, a Channel Quality Indicator CHannel (CQICH) is additionally specified in the CDMA2000 1xEVDV standards. Similarly, in IEEE 802.16d Orthogonal Frequency Division Multiple Access (OFDMA), a BS allocates CQICHs to MSs so that the MSs can report their SNRs periodically. Accordingly, the BS receives the SNRs from the MSs in step 104.

The BS includes a lookup table of available data rates with respect to SNRs as a system parameter. Referring to the SNR versus the data rate look up table in step 105, the BS determines available data rates for the individual MSs in step 106. The BS then selects MSs to transmit data in the current transmission time interval based on the data rates and notifies the selected MSs of their data rates in step 107. For example, MS 1 receives the transmit rate information in step 108.

Figure 4:
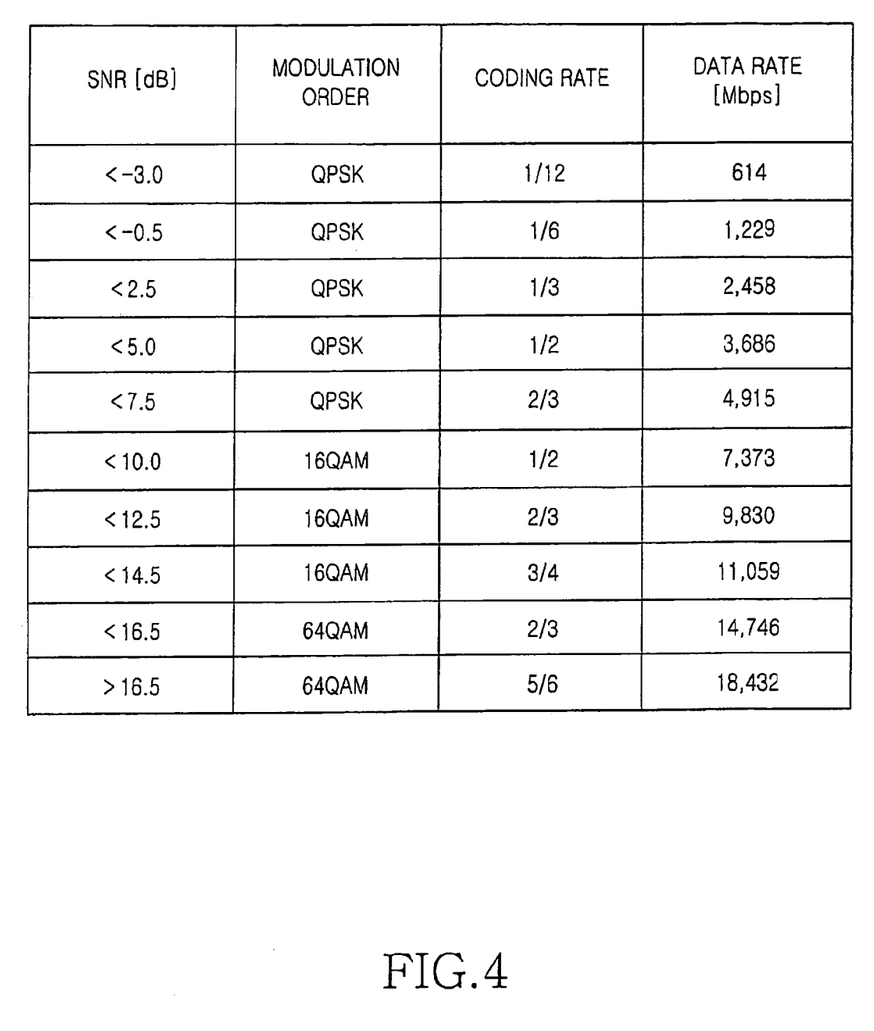
FIG. 4 illustrates an exemplary SNR versus data rate lookup table.

An example of the SNR versus data rate lookup table is illustrated in FIG. 4. Referring to FIG. 4, upon receipt of an SNR measurement from an MS, a modulation order and a coding rate corresponding to the SNR measurement are read from the lookup table. Then, a data rate is correspondingly determined.

In CDMA2000 1xEVDV, a Packet Data Control CHannel (PDCCH) delivers information about MSs and data rates for the MSs, simultaneously with a Packet Data CHannel (PDCH). Therefore, the MSs interpret the PDCCH, determine if they will receive data in the current frame, and if they will, determine at what data rates they will receive the data. However, if the MSs will not receive data in the current frame, the BS notifies an MS associated with each subchannel of its data rate by MAP information broadcast within the coverage area of the BS in the IEEE 802.16d OFDMA system.

In the above conventional data rate determining method, the BS reads a data rate for an MS in correspondence with the feedback SNR of a forward pilot signal received at the MS from the SNR versus data rate lookup table.

Figure 2:
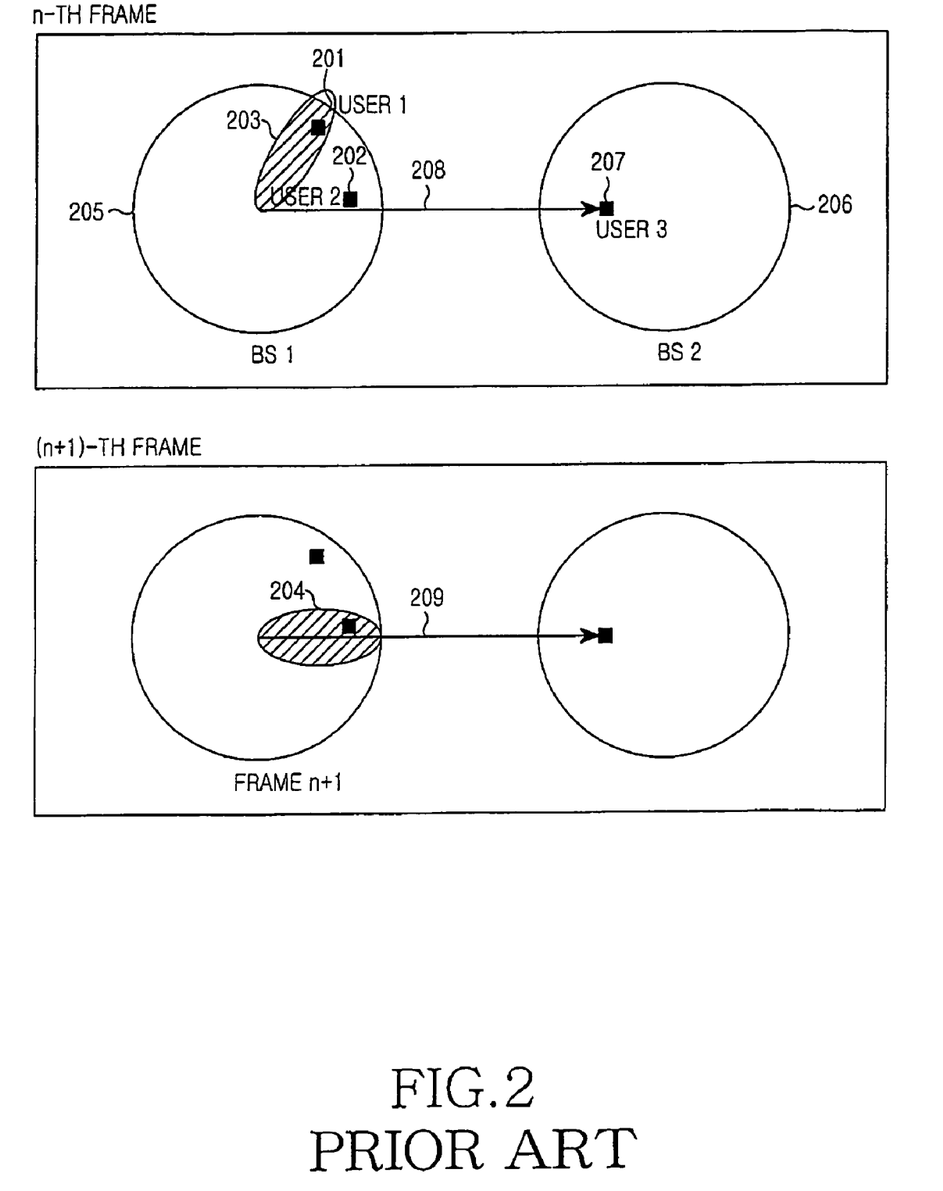
FIG. 2 illustrates a problem facing the conventional data rate determining method.

FIG. 2 illustrates a problem facing the conventional data rate determining method. The conventional problem encountered will be described between two BSs using smart antennas, by way of example.

Referring to FIG. 2, two users 201 and 202 (user 1 and user 2) are located in the cell area of a BS 205 (BS 1). BS 1 transmits data to user 1 in an $n^{th}$ frame and to user 2 in an $(n+1)^{th}$ frame. With a smart antenna, BS 1 concentrates its transmit power in the direction of user 1 in the $n^{th}$ frame, as indicated by reference numeral 203 and in the direction of user 2 in the $(n+1)^{th}$ frame, as indicated by reference numeral 204. If another BS 206 (BS 2) exists around BS 1, the transmit power of BS 1 interferes with a user within the coverage area of BS 2.

In FIG. 2, BS 2 determines a data rate for the $(n+1)^{th}$ frame for a user 207 (user 3) in the $n^{th}$ frame. In the $n^{th}$ frame, the transmit power of BS 1 concentrates toward user 1, not interfering much with BS 2, as indicated by reference numeral 208. Therefore, user 3 feeds back a high SNR measurement of a received pilot signal to BS 2, and BS 2 correspondingly allocates a high data rate to user 3. However, because the transmit power of BS 1 concentrates toward user 2 in the $(n+1)^{th}$ frame, the interference from BS 1 to BS 2 is very strong, as indicated by reference numeral 209. As BS 2 transmits data to user 3 at the high data rate in the $(n+1)^{th}$ frame, the transmission is highly probable to fail due to the strong interference from BS 1. This phenomenon can be explained from Equation (1) below, describing the SNR of a received pilot signal.

$$SNR = \frac{S}{I_{other} + N_o} \qquad (1)$$

In Equation (1), S denotes the strength of a pilot signal received at an MS from a serving BS, $I_{other}$ denotes the strength of pilot signals serving as noise from neighbor BSs, and $N_o$ denotes Additive White Gaussian Noise (AWGN). The AWGN, $N_o$ is maintained at a certain level irrespective of time. However, $I_{other}$ continuously changes depending on the locations of MSs within the neighbor BSs. As a result, the total SNR varies with time, in proportion to the ratio of $I_{other}$ to $N_o$.

As described above, with the use of smart antennas, the transmit power of BSs varies in areas and is concentrated on a different area in each frame. Therefore, the strength of signals received from neighbor cells fluctuates. Because rate decision and data transmission take place in different channel states, a successful reception probability is highly decreased.

SUMMARY OF THE INVENTION

Accordingly, the present invention has been designed to substantially solve at least the above problems and/or disadvantages and to provide at least the advantages below.

An object of the present invention is to provide an apparatus for stably determining a data rate despite time-variant interference from neighbor BSs in a cellular mobile communication system using a smart antenna.

Another object of the present invention is to provide a method of stably determining a data rate despite time-variant interference from neighbor BSs in a cellular mobile communication system using a smart antenna.

A further object of the present invention is to provide a transmitter for transmitting data by stably determining a data rate despite time-variant interference from neighbor BSs in a cellular mobile communication system using a smart antenna.

Still another object of the present invention is to provide a transmission method for transmitting data by stably determining a data rate despite time-variant interference from neighbor BSs in a cellular mobile communication system using a smart antenna.

The above and other objects are achieved by providing a data rate determining method and apparatus in a smart-antenna mobile communication system.

According to an aspect of the present invention, in a transmitter of a smart-antenna cellular mobile communication system, a CQI receiver receives a feedback CQI from an MS. An other-cell interference estimator estimates other-cell interference with respect to total noise received at the MS. A rate decider determines a forward data rate for the MS using a power margin calculated according to the estimated other-cell interference.

According to another aspect of the present invention, in a data rate determining method in a smart-antenna cellular mobile communication system, a feedback CQI is received from an MS. Other-cell interference at the MS is estimated with respect to total noise received at the MS. A forward data rate is determined for the MS using a power margin calculated according to the estimated other-cell interference.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described in detail herein below with reference to the accompanying drawings. In the following description, well-known functions or constructions are not described in detail because they would obscure the invention in unnecessary detail.

The following description is made with the appreciation that a BS operates as a transmitter and an MS operates as a receiver for receiving data from the BS.

Figure 3:
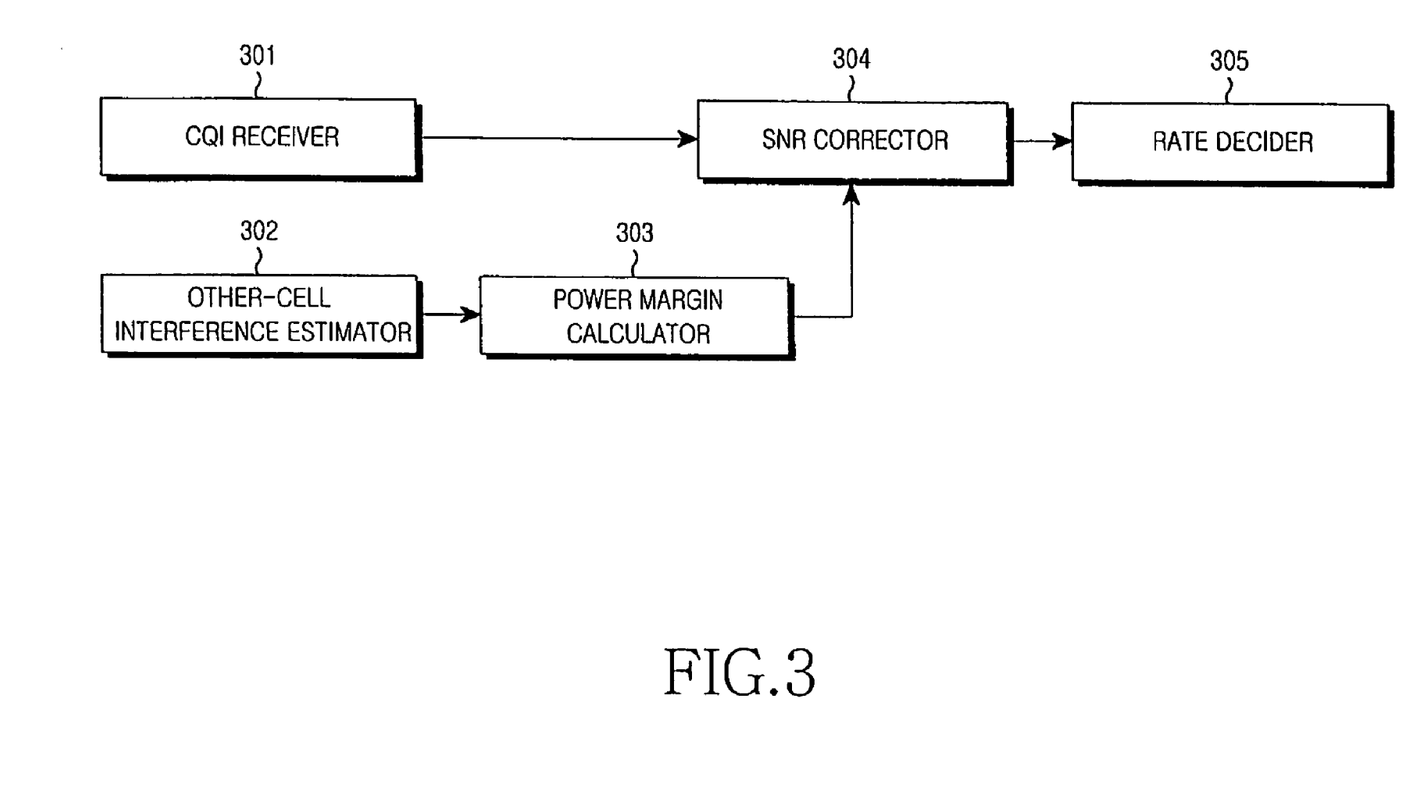
FIG. 3 is a block diagram of an apparatus for determining a data rate according to the present invention.

FIG. 3 is a block diagram illustrating an apparatus for stably determining a data rate in a cellular mobile communication system using a smart antenna, which suffers from highly time-variant other-cell interference due to the use of the smart antenna. This data rate determining apparatus resides in a BS serving as a transmitter.

Referring to FIG. 3, the data rate determining apparatus includes a CQI receiver 301, which acquires a feedback CQI from an MS on a CQICH. More specifically, the CQI receiver 301 receives the SNR measurement of a forward pilot signal from the MS.

While traditionally, the SNR measurement is provided directly to a rate decider 305, according to the present invention, an other-cell interference estimator 302, a power margin calculator 303, and an SNR corrector 304 are additionally intervened between the CQI receiver 301 and the rate decider 305 in order to compensate the SNR measurement.

The other-cell interference estimator 302 estimates the amount of other-cell interference from neighbor BSs, other than AWGN, in a total noise signal received at the MS. If the ratio of the other-cell interference to the total noise is high, this implies that the MS is affected significantly by the other-cell interference and an SNR change is great when data is actually transmitted. In the opposite case, if the ratio of the other-cell interference to the total noise is low, this implies that performance depends mainly on the AWGN in the MS. Therefore, because the AWGN changes not much over time, an SNR is not changed a lot at the actual data transmission time. Accordingly, the other-cell interference estimator 302 estimates an SNR variation that will occur at the actual data transmission time.

The power margin calculator 303 calculates a power margin for an actual SNR based on the estimated SNR variation for the transmission time. If the SNR variation is great, a large power margin is created, but otherwise, the power margin is small.

The SNR corrector 304 subtracts the power margin from the pilot SNR measurement received from the CQI receiver 301 using Equation (2):

$$SNR_{output} = SNR_{CQICH} - P_{margin}(dB), \qquad (2)$$

where $SNR_{CQICH}$ denotes the pilot SNR measurement, $P_{margin}$ denotes the power margin calculated by the power margin calculator 303, and $SNR_{output}$ denotes a corrected SNR output from the SNR corrector 304. When the SNR variation is great, a large power margin is subtracted from the actual SNR. However, if the SNR variation is small, a small power margin is subtracted from the actual SNR. Therefore, when there is a great SNR variation, as much a power margin is secured and thus a transmission success probability is increased, even though the SNR may change a lot at the actual data transmission. However, for a small SNR variation, a minimum power margin is secured, thereby resulting in minimal additional power consumption.

The rate decider 305 determines a data rate by calculating a power margin based on an other-cell interference estimate received from the other-cell interference estimator 302 and achieving a corrected SNR for a transmission signal using the power margin.

Alternatively, the power margin calculator 303 and the SNR corrector 304 may be incorporated in the rate decider 305.

FIG. 4 illustrates an exemplary SNR versus data rate lookup table. More specifically, the data rate lookup table in FIG. 4 is predetermined in the cellular mobile communication system. Referring to this lookup table, a data rate is determined in accordance with a corrected SNR.

Figure 5:
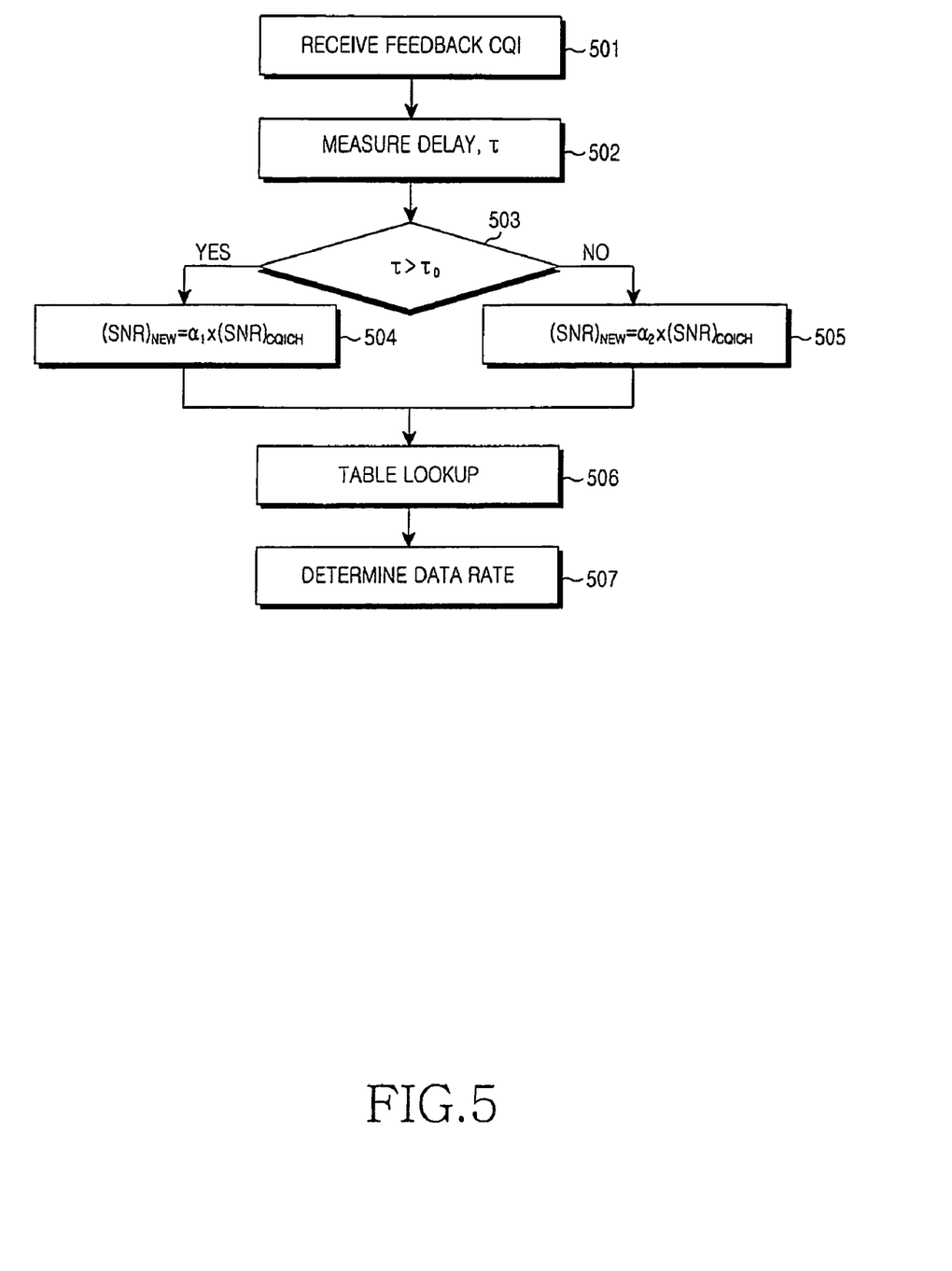
FIG. 5 is a flowchart illustrating a data rate determining operation according to an embodiment of the present invention.

FIG. 5 is a flowchart illustrating a data rate determining operation according to an embodiment of the present invention. Referring to FIG. 5, upon receipt of a CQICH from an MS in step 501, the CQI receiver of the BS acquires the SNR of a forward pilot signal measured at the MS, $(SNR)_{CQICH}$ from the CQICH, as described above with reference to FIG. 3. The BS then measures the transmission delay of the MS, τ in step 502. If τ is long, this implies that the MS is located far from the BS and thus near to a neighbor BS. Hence, the MS suffers from increased other-cell interference.

The BS compares τ with a predetermined threshold $τ_0$ in step 503. If τ exceeds $τ_0$, the BS allocates a corrected SNR, $(SNR)_{new}$ to the MS, considering that the MS is significantly affected by other-cell interference in step 504. $(SNR)_{new}$ is created by subtracting a relatively large power margin from $(SNR)_{CQICH}$. The subtraction of a power margin takes the form of multiplying $(SNR)_{CQICH}$ by a proportional constant. That is, $(SNR)_{new}$ is the product of $(SNR)_{CQICH}$ and a predetermined value a. If τ exceeds $τ_0$, it implies that other-cell interference is great. Therefore, a proportional constant $a_1$ to be multiplied by $(SNR)_{CQICH}$ is relatively much less than 1.

If τ is below $τ_0$, in step 505, the BS considers that the MS suffers from less other-cell interference and allocates $(SNR)_{new}$ produced by subtracting a small power margin from $(SNR)_{CQICH}$ using a proportional constant $a_2$ relatively little less than 1. The following relationship of Equation (3) is placed between $a_1$ and $a_2$.

$$a_1 < a_2 \qquad (3)$$

$a_1$ and $a_2$ are preset under the condition described by Equation (3). Referring to the SNR versus data rate lookup table using the corrected SNR, $(SNR)_{new}$ in step 506, the BS determines an actual data rate for the MS in step 507.

Figure 6:
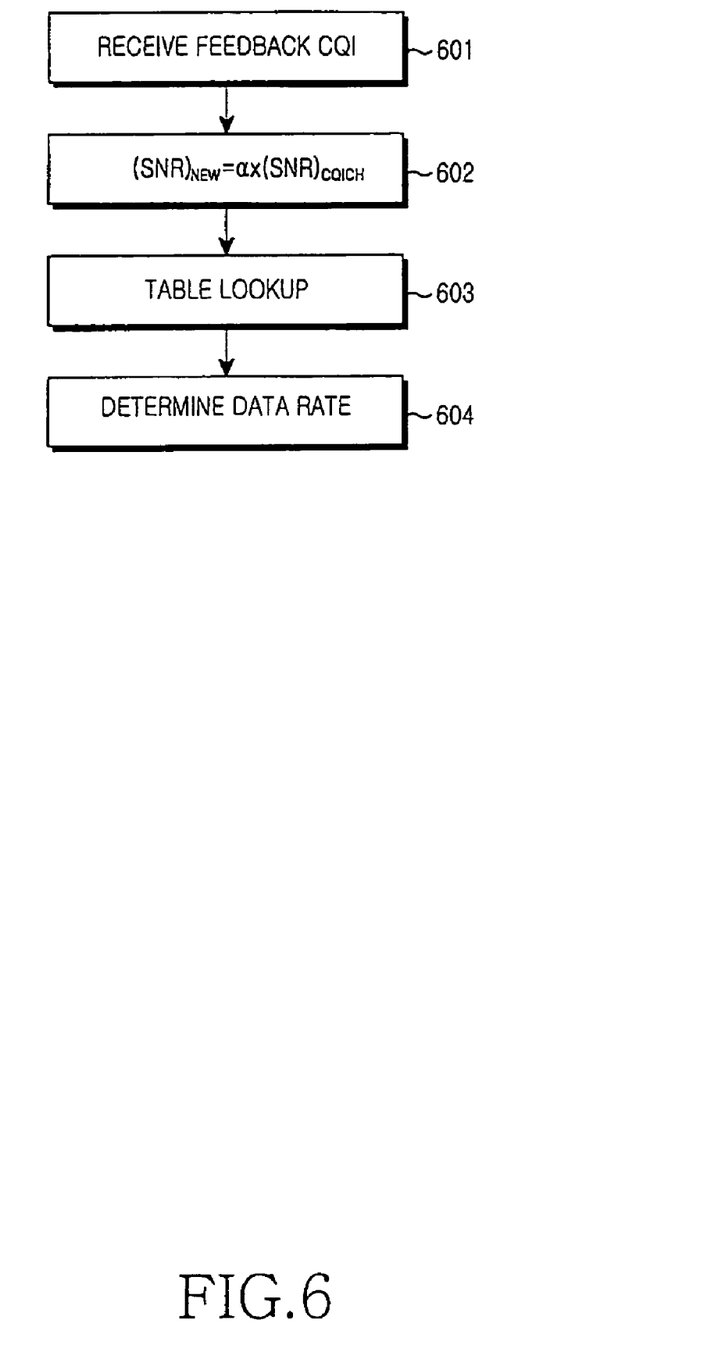
FIG. 6 is a flowchart illustrating a data rate determining operation according to another embodiment of the present invention.

FIG. 6 is a flowchart illustrating a data rate determining operation according to another embodiment of the present invention. This embodiment is characterized by estimating other-cell interference using a received $SNR_{CQICH}$. AWGN does not change significantly either over time or with users. By contrast, the value of other-cell interference changes a lot according to the current location or channel status of an MS. Because the total interference is the sum of AWGN and other-cell interference, if the received $SNR_{CQICH}$ is high, this implies that the total noise is small and the other-cell interference is also small. However, if the received $SNR_{CQICH}$ is low, this implies that the total noise is large and the other-cell interference is also large.

For example, when the MS is located at a cell boundary, a signal received from the serving BS becomes weak and a signal received from a neighbor BS becomes strong. Therefore, the probability of $SNR_{CQICH}$ being low increases. Based on this fact, the received $SNR_{CQICH}$ can be used for estimation of other-cell interference.

Referring to FIG. 6, upon receipt of a feedback SNR measurement of a forward pilot signal on the CQICH from the MS in step 601, the BS sets $(SNR)_{new}$ to the product of $SNR_{CQICH}$ and a predetermined proportional constant a less than 1 in order to ensure a power margin proportional to $SNR_{CQICH}$ in step 602. Referring to the SNR versus data rate lookup table illustrated in FIG. 4 using $(SNR)_{new}$ in step 603, the BS determines a data rate for the UE in step 604.

Figure 7:
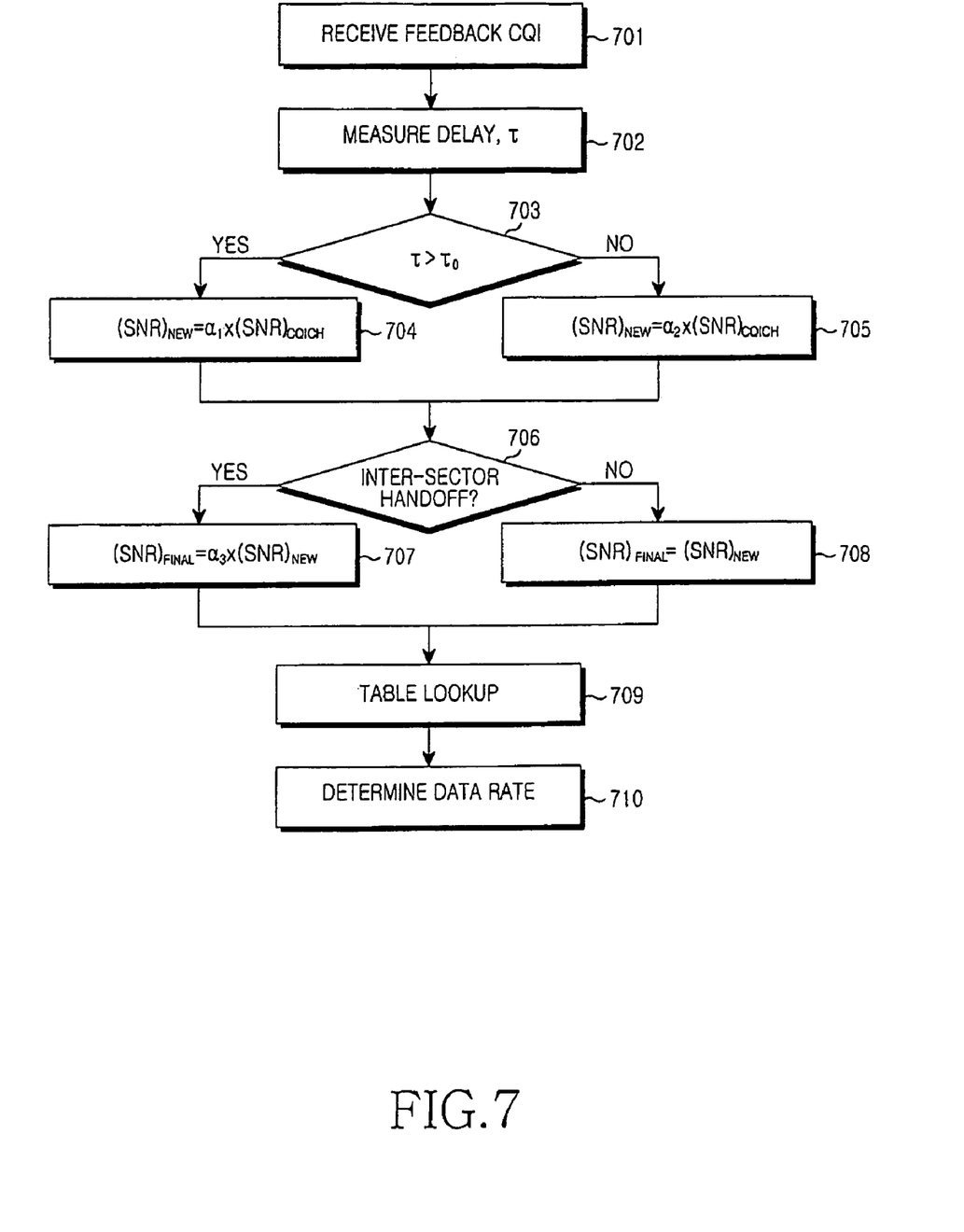
FIG. 7 is a flowchart illustrating a data rate determining operation according to yet another embodiment of the present invention.

FIG. 7 is a flowchart illustrating a data rate determining operation according to yet another embodiment of the present invention. $SNR_{CQICH}$ measured at an MS is influenced by interference from a neighbor sector within the coverage area of the same BS as well as interference from neighbor BSs. Particularly, when the MS is located at a sector boundary within the cell, interference from a neighbor sector may be very influential. Consequently, the difference between other-cell interferences at a data transmission decision time and at an actual data transmission time can be wide. Therefore, the inter-sector interference must be considered in determining a data rate for the MS, as illustrated in FIG. 7.

Referring to FIG. 7, a corrected SNR, $(SNR)_{new}$ is calculated while taking into account a time delay of a signal from the MS, in the same manner as illustrated in FIG. 5, in steps 701 through 705. The BS then determines if the MS is at an inter-sector handoff in step 706. If the MS is at an inter-sector handoff, the BS calculates a final SNR, $(SNR)_{final}$ by multiplying an additional power margin $a_3$ by the product of $(SNR)_{CQICH}$ and a proportional constant $a_1$ or $a_2$ in step 707, thereby rendering the MS to be robust against the inter-sector interference. Here, $a_3$ is a predetermined value less than 1.

However, if the MS is not at an inter-sector handoff, $(SNR)_{final}$ is set to $(SNR)_{new}$ in step 708. Referring to the SNR versus data rate lookup table illustrated in FIG. 4 using $(SNR)_{final}$ in step 709, the BS determines a data rate for the MS in step 710.

Figure 8:
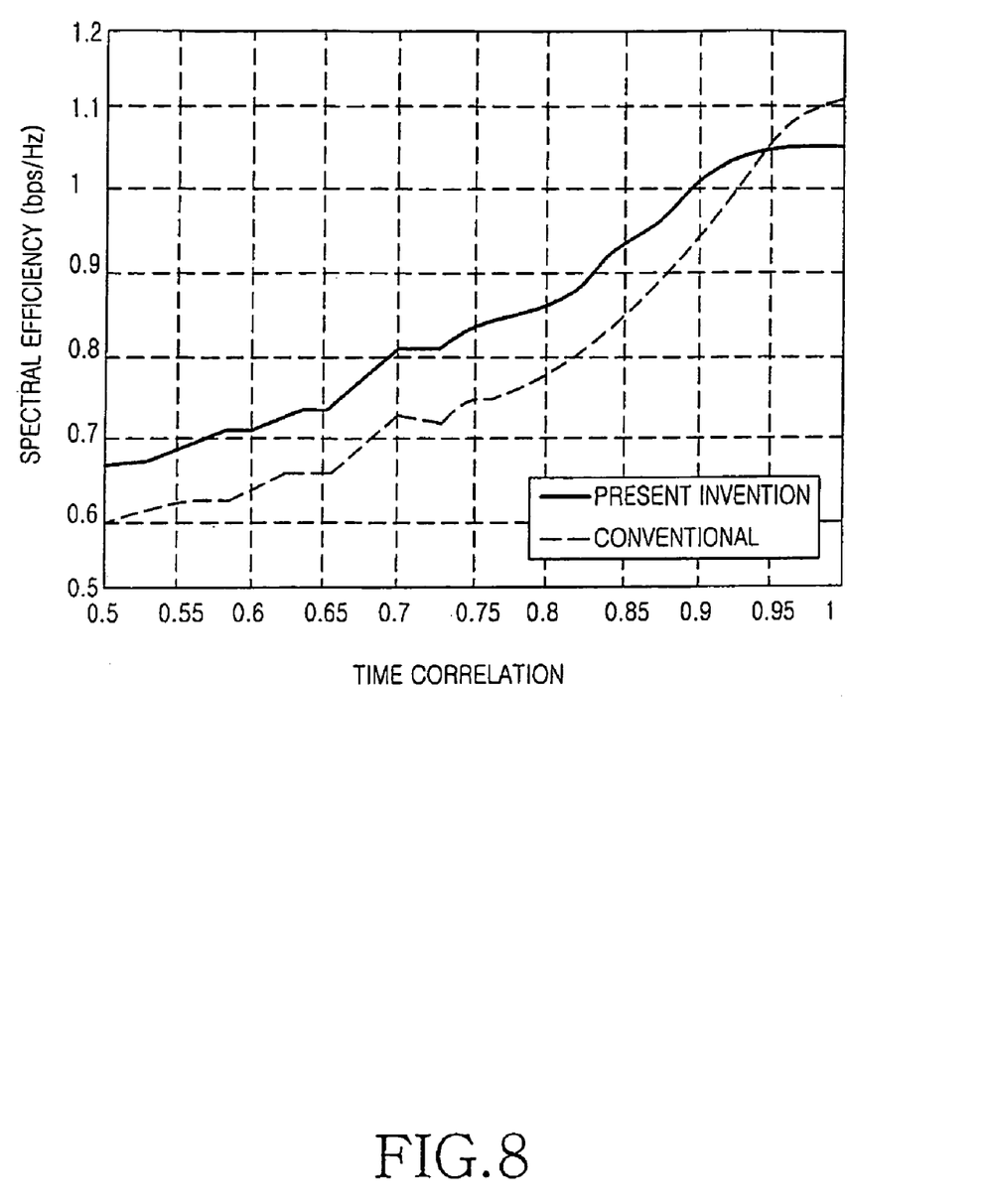
FIG. 8 is a graph illustrating a performance of data rate determination in the method illustrated in FIG. 5.

FIG. 8 is a graph illustrating a performance of data rate determination in the method illustrated in FIG. 5. The data rate determination method illustrated in FIG. 5 is compared with the conventional data rate determination method in terms of performance. More specifically, the graph shows simulated spectral efficiency with respect to time correlation of other-cell interference when the time delay of the MS is longer than $τ_0$. The time correlation of other-cell interference is approximated a shown in Equation (4):

$$I_{new} = a \times I_{old} + (1-a)I_{add}, \qquad (4)$$

where $I_{old}$ denotes other-cell interference at the rate decision time, $I_{new}$ denotes other-cell interference at the data transmission time, and $I_{add}$ denotes a random number that offers the same average power as $I_{old}$ and is independent of $I_{old}$. Thus, for a=1, $I_{new}=I_{old}$, which implies that other-cell interference power is equal at the data rate decision time and at the data transmission time.

For a=0, the other-cell interference power at the data rate decision time is fully independent of that at the data transmission time. In the simulation, 0.1 is selected as $a_1$. The simulation was carried out under the assumption of a complex Gaussian random distribution of other-cell interference and an average SNR of 7 dB. Given an SNR, the spectral efficiency is calculated using Equation (5):

$$\text{spectral efficiency} = \log_2(I + SNR/\gamma), \quad (5)$$

which is a modification to the Shannon's capacity limit equation.

Equation (5) is different from the Shannon's capacity limit equation in that SNR is divided by $\gamma$. Because a high SNR relative to an actual data rate results from the Shannon's capacity limit equation, $\gamma$ is used to compensate for the discrepancy. $\gamma=2$ in the simulation.

As noted from FIG. 8, the conventional method exhibits excellent performance in a time period for which other-cell interference does not change ($\gamma>0.95$), whereas the present invention has excellent spectral efficiency in a time period for which other-cell interference changes ($\gamma<0.95$).

In accordance with the present invention, the ratios of AWGN and other-cell interference to total noise received in an MS are estimated and a power margin proportional to time-variant other-cell interference is applied in determining a data rate for the MS. Therefore, despite the change of other-cell interference between at a data rate decision time and at a data transmission time, the success rate of data transmission is increased and thus total cell throughput is also increased.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A transmitter in a smart-antenna cellular mobile communication system, comprising:
    a channel quality indicator (CQI) receiver for receiving a feedback CQI from a mobile station (MS);
    an other-cell interference estimator for estimating other-cell interference with respect to total noise received at the MS using the feedback CQI; and
    a rate decider for determining a forward data rate for the MS using a power margin calculated according to the estimated other-cell, interference, and comprising a power margin calculator for calculating the power margin using the estimated other-cell interference and a signal-to-noise ratio (SNR) corrector for calculating a corrected SNR by subtracting the power margin from a feedback SNR being the CQI;
    wherein the other-cell interference estimator estimates the other-cell interference using a transmission delay of data received from the MS.

2. The transmitter of claim 1, wherein the CQI is a signal-to-noise ratio (SNR) of a forward pilot signal received at the MS from a base station (BS).

3. The transmitter of claim 1, wherein the other-cell interference estimator estimates the other-cell interference using the feedback SNR of a forward pilot signal received from the MS.

4. The transmitter of claim 1, wherein the subtraction of the power margin from the SNR is equivalent to multiplication of the SNR by a constant less than 1 in calculating the corrected SNR.

5. A data rate decider in a smart-antenna cellular mobile communication system, comprising:
    a channel quality indicator (CQI) receiver for receiving a feedback CQI from a mobile station (MS);
    an other-cell interference estimator for estimating other-cell interference with respect to total noise received at the MS using the feedback CQI;
    a power margin calculator for calculating a power margin using the estimated other-cell interference; and
    a signal-to-noise ratio (SNR) corrector for calculating a corrected SNR by subtracting the power margin from a feedback SNR being the CQI;
    wherein the other-cell interference estimator estimates the other-cell interference using a transmission delay of data received from the MS.

6. The transmitter of claim 5, wherein the other-cell interference estimator estimates the other-cell interference using the feedback SNR of the forward pilot signal received from the MS.

7. The transmitter of claim 5, wherein the subtraction of the power margin from the SNR is equivalent to multiplication of the SNR by a constant less than 1 in calculating the corrected SNR.

8. A data rate determining method in a smart-antenna cellular mobile communication system, comprising the steps of:
    receiving a feedback CQI from a mobile station (MS);
    estimating other-cell interference with respect to total noise received at the MS using the feedback CQI; and
    determining a forward data rate for the MS, by calculating a power margin using the estimated other-cell interference and calculating a corrected a signal-to-noise ratio (SNR) by subtracting the power margin from a feedback SNR being the CQI,
    wherein the other-cell interference is estimated using a transmission delay of data received from the MS.

9. The data rate determining method of claim 8, wherein the CQI is a signal-to-noise ratio (SNR) of a forward pilot signal received at the MS from a base station (BS).

10. The data rate determining method of claim 9, wherein the other-cell interference is estimated using the feedback SNR of the forward pilot signal received from the MS.

11. The data rate determining method of claim 8, wherein the step of calculating the corrected SNR comprises the step of subtracting the power margin from the SNR by multiplying the SNR by a constant less than 1.

* * * * *